Jan. 6, 1970     L. J. BRUNELLE     3,487,745
FASTENER
Filed May 28, 1968

INVENTOR:
LAWRENCE J. BRUNELLE

BY    H. Samuel Kieser

ATTORNEY

United States Patent Office 3,487,745
Patented Jan. 6, 1970

3,487,745
FASTENER
Lawrence J. Brunelle, East Haven, Conn., assignor to Olin Mathieson Chemical Corporation, a corporation of Virginia
Filed May 28, 1968, Ser. No. 732,736
Int. Cl. F16b *13/04, 33/04*
U.S. Cl. 85—68                     8 Claims

ABSTRACT OF THE DISCLOSURE

A fastener and drive pin assembly including a fastener member having a tapered forward portion and a flange at its rearward end. A bore is provided in the rearward end of the fastener for reception of a drive pin. The bore is provided with a shoulder for mating engagement with the shoulder on the drive pin so that relative movement of the drive pin with respect to the fastener will flare an intermediate portion of the fastener outwardly.

---

This invention relates generally to fasteners. More particularly this invention relates to fasteners of the type that can be installed by an operation from only one side of the work material.

A "blind" fastener is a fastener that can be inserted into material and set in place with the entire operation taking place on one side of the workpiece. All of the common "blind" fasteners require a separate operation to provide a hole in the work surface for insertion of the fastener and a separate operation to set it in place. Needless to say, this is a time consuming operation.

Therefore, it is an object of the present invention to provide an improved type of "blind" fastener.

Another object of the present invention is to provide a fastener which can be used to punch its own hole.

A further object of this invention is to provide a fastener which can punch its own hole and be expanded into place in one operating stroke.

These and other objects and advantages of the present invention will become more apparent by reference to the following description of a preferred embodiment and to the accompanying drawings in which:

FIGURE 3 is a transverse sectional view taken along the lines 3—3 of FIGURE 1;

Figure 1:
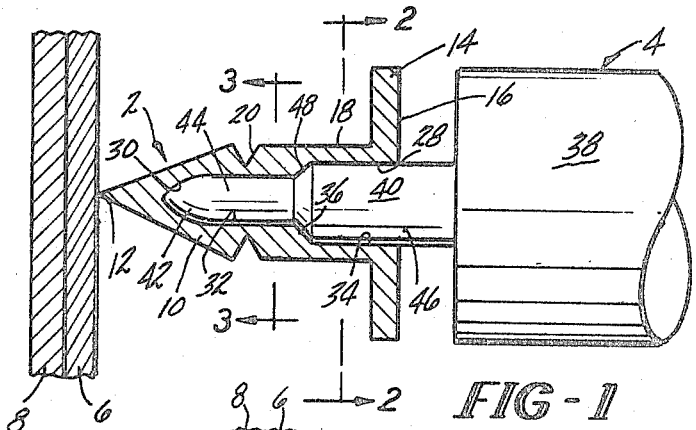
FIGURE 1 is a partial cross-sectional view showing the fastener about to be driven into the work surface.
Figure 2:
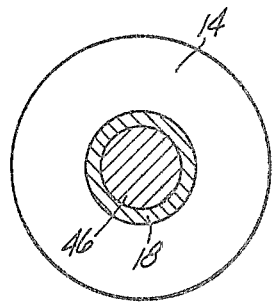
FIGURE 2 is a transverse sectional view taken along the lines 2—2 of FIGURE 1.

Referring to the drawings, the fastener 2 of the present invention is shown mounted on a drive pin 4. The fastener 2 is particularly adapted for joining two relatively thin sheets of such material as metal, wood, wallboard, or the like. Two such sheets to be joined together are indicated by numerals 6 and 8 in the drawings.

The fastener 2 includes a tapered head portion 10 which converges to a sharp point 12 at its forward end. The rearward end of the fastener 2 has an enlarged flange 14 having a flat end surface 16 which is substantially perpendicular to the axis of the fastener. An intermediate body portion 18 having a cylindrical outer surface is provided between the flange 14 and head portion 10 and is provided with a score line 20 immediately to the rear of the head portion 10.

The rearward end of the fastener 2 is provided with a bore 28. The bore 28 has a tapered forward wall 30, a first cylindrical wall portion 32 and a second cylindrical wall portion 34 of larger diameter than the first cylindrical portion 32. The second cylindrical portion 34 extends inwardly from the rearward surface 16 of the flange 14 and the first cylindrical portion 32 extends rearwardly from the tapered forward wall 30. An internal shoulder 36 is provided between the first and second cylindrical portions 32 and 34, respectively. This internal shoulder 36 tapers inwardly and forward.

The drive pin 4 includes a body portion 38 which is generally cylindrical in configuration having a diameter substantially equal to the diameter of the flange 14 and a shank portion 40 upon which the fastener 2 is mounted. The shank portion has a configuration similar to that of the bore 28. Thus, it includes a tapered nose portion 42, a first reduced cylindrical portion 44, and an enlarged cylindrical portion 46 which is connected to the body 38. The first and second cylindrical portions 44 and 46 are separated by a tapering portion 48 which has a taper to mate with the tapered shoulder 36 in the bore 28 of the fastener 2. The diameter of the first and second cylindrical portions 44 and 46 are such that the fastener 2 is retained on the shank portion 40 by a friction fit.

If it is desired to drive the fastener 2 by hand, the body 38 of the drive pin 4 has a flat end surface 50 to receive the repeated blows from a hammer. As an alternative, if it is desired to drive a fastener 2 by any one of the conventional piston-type, explosive-actuated tools, the shank portion 40 can be attached to a flange 52 in place of the body portion 38. The flange 52 should have an outside diameter substantially the same size as the piston 54 of the tool so that it can be received within the muzzle bushing of the appropriate tool.

Figure 4:
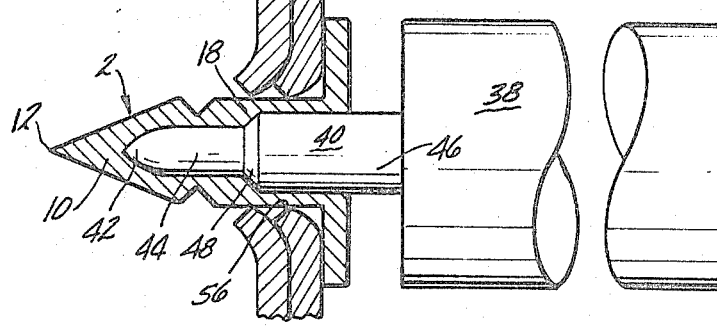
FIGURE 4 is a partial sectional view showing the fastener in an intermediate stage of the fastening operation.
Figure 5:
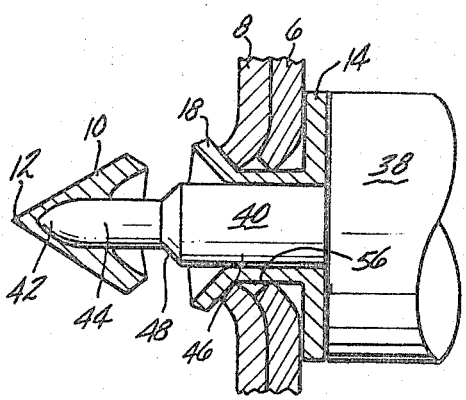
FIGURE 5 is a partial sectional view showing the fastener at the completion of the fastening stroke.
Figure 6:
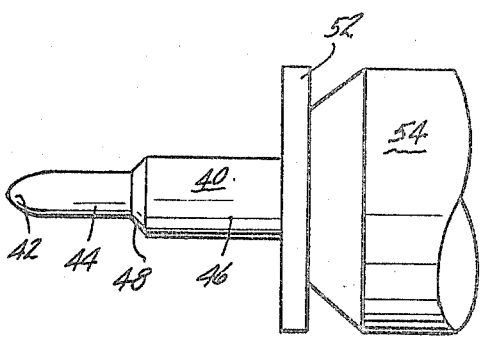
FIGURE 6 is a plan view showing the modified form of a drive pin which can be utilized with a piston.

To commence with the fastening operation, the point 12 of the fastener 2, after the fastener 2 has been mounted on the drive pin 4, is placed on the work surface at the desired location. An appropriate amount of force is applied to drive the fastener through the sheets 6 and 8 until the flange 14 abuts the outer sheet 6 as shown in FIGURE 4. At this point, when additional force is applied to the drive pin 4, the flange 14 will prevent further penetration of a fastener 2 so that as the drive pin 4 moves toward the workpiece relative to the fastener 2, the tapered nose portion 42 of the shank 40 tends to drive the head portion 10 of the fastener forwardly while the tapering portion 48 tends to flare the cylindrical portion 18 of the fastener outwardly due to the camming action of the tapered portion 48 and the internal shoulder 36. This dual action tends to break the head 10 of the fastener 2 away from the cylindrical body portion 18 at the score line 20 and at the same time tends to flare the forward portion of the cylindrical body 18 outwardly beyond the edge of the opening 56 thereby securing the two members together.

While reference has been made above to a specific embodiment of this invention, various modifications and alterations will readily suggest themselves to those skilled in the art.

What is claimed is:

1. A fastener and drive pin assembly comprising a fastener member having a forward and a rearward end, said fastener member including a forward portion with an outer surface tapering to a point at said forward end, an intermediate portion, a flange at the rearward end of said intermediate portion, a weakened portion between said forward portion and said intermediate portion, and a bore extending axially into said fastener from said rearward end and terminating short of said forward end;

a drive pin including a shank portion received within said bore, said bore being defined by a forward tapering wall positioned axially forwardly of said weakened portion, a first cylindrical wall rearward of said tapering wall, a second cylindrical wall rearward of said first cylindrical wall and of greater diameter than said first wall, and a shoulder between said first and second walls and positioned axially rearwardly of said weakened portion, said shank portion including a tapering tip portion mating with said tapering wall, a first cylindrical portion mating with said first cylindrical wall, a second cylindrical portion mating with said second cylindrical wall, and an abutment between said first and second cylindrical portions in engagement with said shoulder.

2. The fastener and drive pin assembly as set forth in claim 1 wherein said shoulder comprises a surface tapering inwardly and forwardly and said abutment comprises a tapering surface mating with said shoulder.

3. The fastener and drive pin assembly as set forth in claim 2 wherein said weakened portion comprises a score line extending circumferentially about the outer surface of said fastener.

4. The fastener and drive pin assembly of claim 2 wherein said drive pin includes an enlarged body portion having a diameter equal to the diameter of said flange, said shank portion extending from the forward surface thereof, and said forward surface being spaced from said flange a sufficient distance to permit driving of said drive pin relative to said fastener to set said fastener.

5. The fastener and drive pin assembly of claim 2 wherein said drive pin includes a flange positioned at the rearward end of said shank portion, said flange on said drive pin having a diameter equal to the diameter of said flange on said fastener and spaced therefrom a distance sufficient to permit the driving of said drive pin relative to said fastener to set said fastener.

6. A fastener having a forward and a rearward end comprising a forward portion having an outer surface tapering to a point at said forward end, an intermediate body portion, a flange at the rearward end of said body portion, a weakened portion between said forward portion and said intermediate body portion, and a bore extending axially into said fastener from said rearward end and terminating short of said forward end, said bore being defined by a forward tapering wall positioned axially forwardly of said weakened portion, a first cylindrical wall extending rearwardly from said tapering wall, a second cylindrical wall rearward of said first wall and of greater diameter than said first wall, and a shoulder between said first and second walls and positioned axially rearwardly of said weakened portion.

7. The fastener of claim 6 wherein said shoulder comprises a surface tapering inwardly and forwardly.

8. The fastener of claim 7 wherein said weakened portion comprises a score line extending circumferentially about the outer surface of said fastener.

References Cited

UNITED STATES PATENTS

| | | | |
|---|---|---|---|
| 1,476,836 | 12/1923 | Pleister | 85—72 |
| 2,466,013 | 4/1949 | Eaton | 85—72 |
| 3,044,340 | 7/1962 | Luhm | 85—83 |

OTHER REFERENCES

German printed application, F 12531 X11/47a, Jan. 19, 1956, Newman.

EDWARD C. ALLEN, Primary Examiner

U.S. Cl. X.R.

85—72, 82